US009003607B1

(12) United States Patent
Hsu

(10) Patent No.: US 9,003,607 B1
(45) Date of Patent: Apr. 14, 2015

(54) TRANSMISSION DEVICE APPLIED TO ROTARY SHAFTS

(71) Applicant: First Dome Corporation, New Taipei (TW)

(72) Inventor: An Szu Hsu, New Taipei (TW)

(73) Assignee: First Dome Corporation, New Taipei (TW)

( * ) Notice: Subject to any disclaimer, the term of this patent is extended or adjusted under 35 U.S.C. 154(b) by 0 days.

(21) Appl. No.: 14/149,937

(22) Filed: Jan. 8, 2014

(30) Foreign Application Priority Data

Dec. 17, 2013 (TW) ............................. 102223836 U

(51) Int. Cl.
*G06F 1/16* (2006.01)
*F16H 21/44* (2006.01)

(52) U.S. Cl.
CPC .............. *G06F 1/1681* (2013.01); *F16H 21/44* (2013.01); *Y10T 16/547* (2015.01); *G06F 1/162* (2013.01); *G06F 1/1618* (2013.01)

(58) Field of Classification Search
USPC ................... 16/221, 223, 366, 371, 348, 357; 74/99 R
See application file for complete search history.

(56) References Cited

U.S. PATENT DOCUMENTS

| 7,832,056 | B2 * | 11/2010 | Kuwajima et al. | 16/366 |
|---|---|---|---|---|
| 8,272,104 | B2 * | 9/2012 | Chen et al. | 16/366 |
| 8,385,991 | B2 * | 2/2013 | Wang et al. | 16/221 |
| 8,615,848 | B2 * | 12/2013 | Mitsui | 16/366 |
| 8,776,319 | B1 * | 7/2014 | Chang et al. | 16/366 |
| 8,904,601 | B2 * | 12/2014 | Hsu | 16/366 |
| 8,914,946 | B2 * | 12/2014 | Hsu et al. | 16/366 |
| 2009/0227301 | A1 * | 9/2009 | Lindvall | 16/366 |
| 2009/0241292 | A1 * | 10/2009 | Wang et al. | 16/387 |
| 2011/0258811 | A1 * | 10/2011 | Borkgren et al. | 16/366 |
| 2011/0308041 | A1 * | 12/2011 | Le et al. | 16/366 |
| 2013/0175914 | A1 * | 7/2013 | Lin | 16/366 |
| 2013/0187525 | A1 * | 7/2013 | Chuang | 16/366 |
| 2013/0194741 | A1 * | 8/2013 | Uchiyama et al. | 16/371 |
| 2015/0013107 | A1 * | 1/2015 | Shin et al. | 16/366 |

* cited by examiner

*Primary Examiner* — Jeffrey O Brien
(74) *Attorney, Agent, or Firm* — Rosenberg, Klein & Lee

(57) ABSTRACT

A transmission device applied to rotary shafts for facilitating the assembling process. The transmission device includes at least one rotary shaft, a drive member movable along with the rotation of the rotary shaft, a transversely movable driver, a turning unit and a transmission unit. The turning unit has a first end connected with the driver and a second end assembled with the transmission unit. When the transmission unit is longitudinally moved, a connection section and a carrier body are driven by the transmission unit to lift or lower a base body or a frame in accordance with the operation mode of an electronic apparatus.

35 Claims, 8 Drawing Sheets

TRANSMISSION DEVICE APPLIED TO ROTARY SHAFTS

BACKGROUND OF THE INVENTION

1. Field of the Invention

The present invention relates generally to a transmission device applied to rotary shafts, and more particularly to a transmission device including at least one rotary shaft, a drive member movable along with the rotation of the rotary shaft, a driver, a turning unit and a transmission unit. When the transmission unit is longitudinally moved, a carrier body is driven by the transmission unit to lift or lower a base body in accordance with the operation mode of an electronic apparatus.

2. Description of the Related Art

There are various electronic apparatuses provided with covers or display screens, such as mobile phones, notebooks, PDA, and electronic books. The covers or display screens are pivotally mounted on the electronic apparatuses via pivot pins or rotary shafts, whereby the covers or display screens can be freely rotated and opened/closed under external force.

In order to operate the display module (such as the screen) and/or the apparatus body module of the electronic apparatus in more operation modes and application ranges, a conventional structure as shown in FIG. 1 is disclosed for driving a frame to ascend/descend so as to protect and prevent the keyboard disposed on the apparatus body module from being mis-touched when the display module and/or apparatus body module is rotated.

Referring to FIG. 1, a (dual) rotary shaft B and a case C enclosing the shaft B are mounted on the apparatus body module A1 of an electronic apparatus A. The rotary shaft B has an eccentric section B1, which is eccentrically rotatable with the rotation of the rotary shaft B. A transmission support B2 is connected to the eccentric section B1. The transmission support B2 cooperates with a connection section B3 to assemble with a carrier body B4. When a user operates the display module or the apparatus body module A1 to 180°~360° rotate/open the same to serve as a tablet, the eccentric section B1 of the rotary shaft pushes the transmission support B2, the connection section B3 and the carrier body B4 to (longitudinally) displace. At this time, the carrier body B4 pushes a frame A2 disposed on the apparatus body module A1 to ascend/descend, whereby the frame A2 is positioned at a height higher than that of the keyboard A3 as a support frame for the electronic apparatus. Also, the frame A2 serves to protect and prevent the keyboard A3 disposed on the apparatus body module A1 from being mis-touched.

In the above structure, in order to permit the transmission support B2 to be drivingly connected to the eccentric section B1 of the rotary shaft, the case C must be formed with notch C1 for the transmission support b2 to pass and move through. Obviously, the notch C1 will affect the appearance design and visual feeling of the electronic apparatus A as a whole. Also, the dust or the like is likely to pass through the notch to accumulate on the components inside the case C. This is not what we expect.

Moreover, with respect to the assembling process and structural design of the transmission device of the rotary shaft, the connection section B3 must be equipped with a claw section B5 for holding the transmission support B2. In addition, an L-shaped restriction board A5 is disposed on a chassis A4 of the apparatus body module A1. The restriction board A5 is assembled with a raised section B6 formed on the connection section B3, whereby the connection section B3 is restricted on the chassis A4 to move along with the transmission support B2. As well known by those who are skilled in this field, the cooperative structure between the transmission support B2, the connection section B3 and the chassis A4 is relatively complicated. This increases the difficulty in assembling the components.

The conventional transmission device of the rotary shaft and the relevant connection components thereof have some shortcomings in use and structural design that need to be overcome. It is therefore tried by the applicant to provide a transmission device applied to rotary shafts to eliminate the shortcomings existing in the conventional transmission device so as to widen the application range of the transmission device. For example, in comparison with the conventional transmission device of rotary shaft, the transmission device of the present invention is applied to a notebook or a small-size electronic apparatus. In condition of lightweight and thin design, the case enclosing the rotary shaft is kept complete to improve the appearance and visual feeling of the electronic apparatus. Also, the case is free from the notch so that the dust or the like will not accumulate on the components arranged in the case. Moreover, the transmission device of the present invention is simplified relative to the complicated cooperative structure of the conventional transmission device. Therefore, the transmission device of the present invention is easy to assemble.

SUMMARY OF THE INVENTION

It is therefore a primary object of the present invention to provide a transmission device applied to rotary shafts for facilitating the assembling process. The transmission device includes at least one rotary shaft, a drive member movable along with the rotation of the rotary shaft, a transversely movable driver, a turning unit and a transmission unit. The turning unit has a first end connected with the driver and a second end assembled with the transmission unit. When the transmission unit is longitudinally moved, a connection section and a carrier body are driven by the transmission unit to lift or lower a base body or a frame in accordance with the operation mode of an electronic apparatus.

In the above transmission device applied to rotary shafts, the rotary shaft has a pivoted section assembled with a torque module and fixing section connected with an apparatus body module or a display module. The drive member is fitted on the rotary shaft between the pivoted section and the fixed section. Corresponding to the drive member, the driver is provided with a guide section assembled with the drive member. Via the guide section, when the drive member is rotated, the driver is driven by the drive member to move.

In the above transmission device applied to rotary shafts, the rotary shaft includes a first rotary shaft and a second rotary shaft. The fixed section of the first rotary shaft is connected with and disposed on the apparatus body module of the electronic apparatus. The fixed section of the second rotary shaft is connected with and disposed on the display module of the electronic apparatus. A link unit is disposed between the first and second rotary shafts for synchronously rotating the first and second rotary shafts.

In the above transmission device applied to rotary shafts, the transmission unit has a pivoted end pivotally connected with the second end of the turning unit and a transmission section drivingly connected with the connection section. The transmission section includes a push end and at least one cantilever positioned on one side of the push end. The cantilever is elastically expandable. The present invention can be best understood through the following description and accompanying drawings, wherein:

DETAILED DESCRIPTION OF THE PREFERRED EMBODIMENTS

Figure 1:
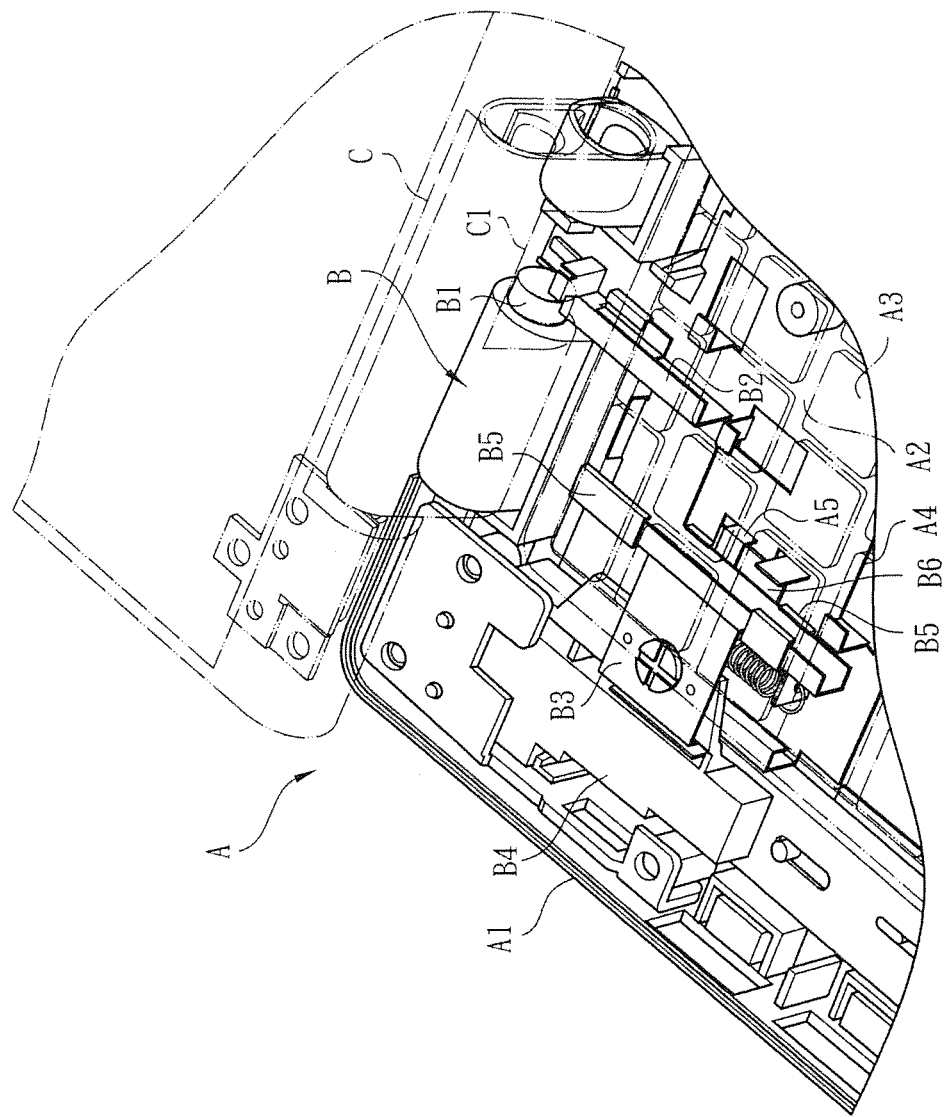
FIG. 1 is a perspective view of a conventional rotary shaft transmission device, in which the phantom line shows a keyboard positioned on a chassis.
Figure 2:
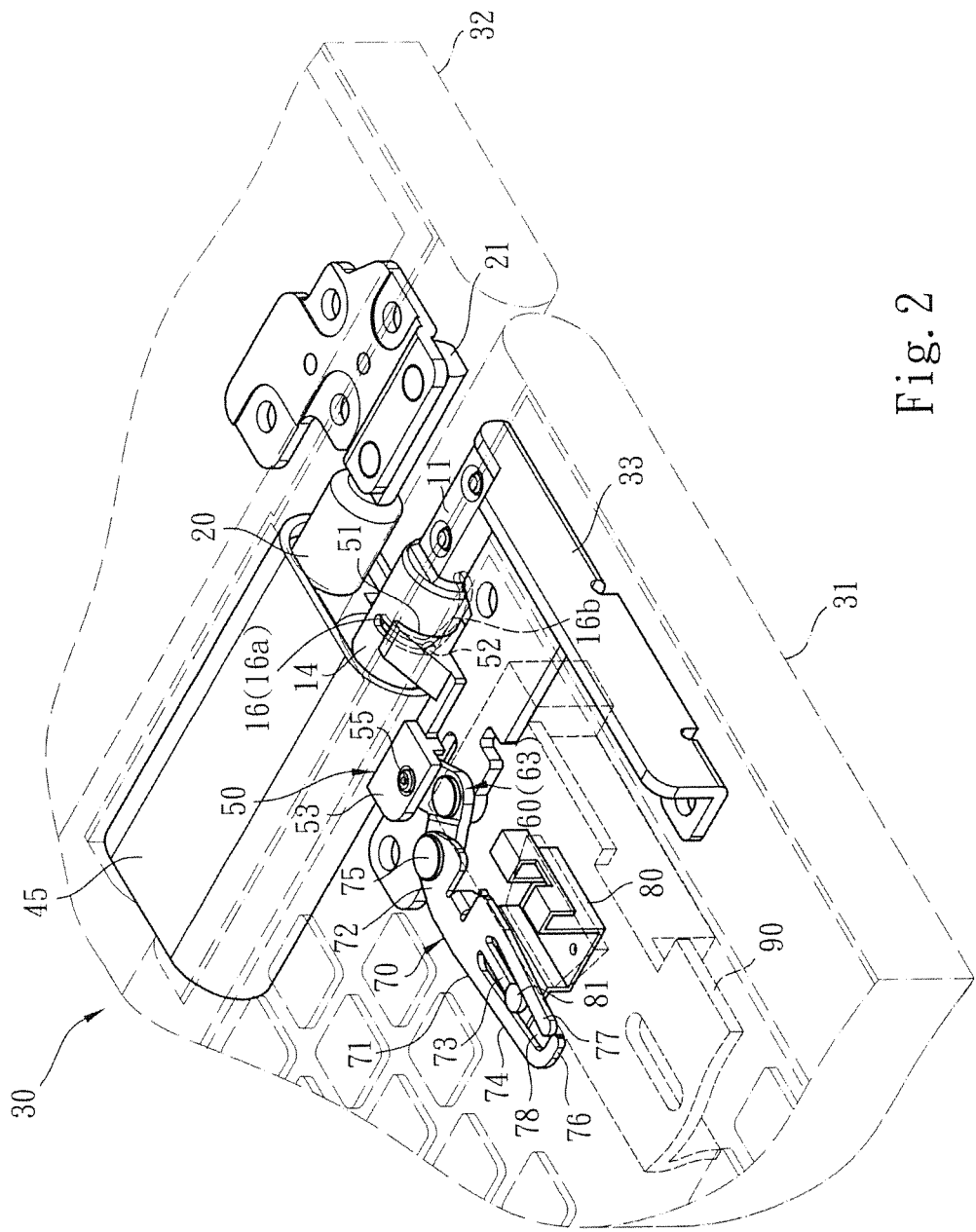
FIG. 2 is a perspective assembled view of the present invention, showing the cooperation between the first and second rotary shafts, the drive member, the driver, the turning unit and the transmission unit.
Figure 3:
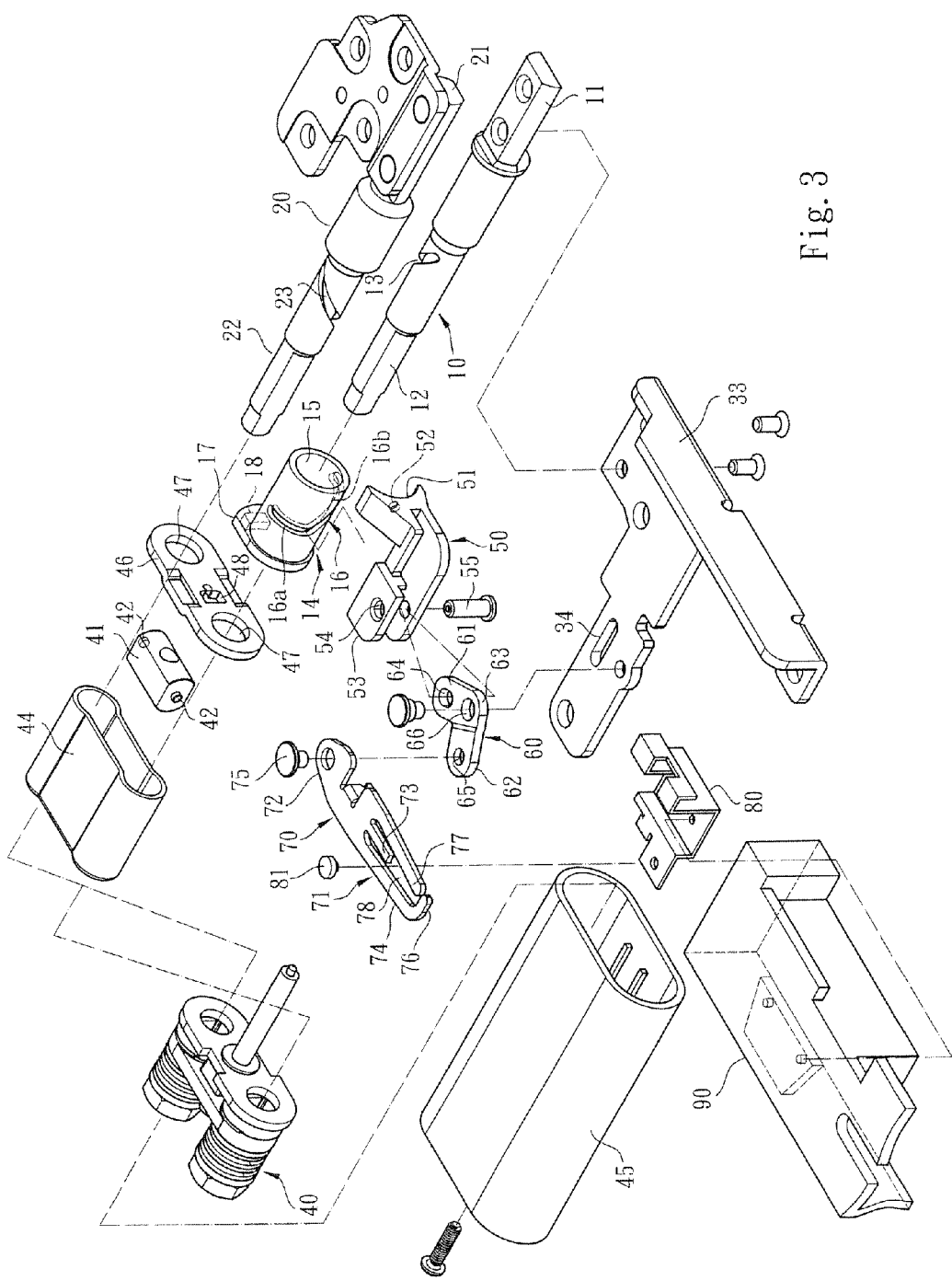
FIG. 3 is a perspective exploded view of the present invention, showing the structural forms of the first and second rotary shafts, the drive member, the driver, the turning unit, the transmission unit and the connection section.

Please refer to FIGS. 2 and 3. The transmission device applied to rotary shafts of the present invention is assembled with an electronic apparatus (such as a computer) for illustration purposes. The rotary shafts include a first rotary shaft 10 and a second rotary shaft 20. Each of the first and second rotary shafts 10, 20 has a fixed section 11, 21 and a pivoted section 12, 22. The fixed section 11 of the first rotary shaft is connected with and disposed on an apparatus body module 31 of an electronic apparatus 30 or connected with and disposed on a fixing board 33 of the apparatus body module 31. The fixed section 21 of the second rotary shaft is connected with and disposed on a display module 32 of the electronic apparatus 30. The pivoted sections 21, 22 of the first and second rotary shafts 10, 20 are (respectively) assembled with a torque module 40. Accordingly, when the action force of a user for rotating the apparatus body module 31 or the display module 32 disappears, the first and second rotary shafts 10, 20 are immediately located. The torque module 40 pertains to prior art and thus will not be further described hereinafter.

In this embodiment, a link unit 41 is disposed between the first and second rotary shafts 10, 20 for synchronously rotating the first and second rotary shafts 10, 20. To speak more specifically, the first and second rotary shafts 10, 20 are formed with spiral grooves 13, 23 in adjacency to the pivoted sections 12, 22. Corresponding to the spiral grooves 13, 23, two ends of the link unit 41 are provided with boss sections 42, which are respectively inlaid in the spiral grooves 13, 23. When a user operates and rotates the display module 32, the second rotary shaft 20 is driven and rotated to force the link unit 41 to drive and rotate the first rotary shaft 10 and the apparatus body module 31.

As shown in the drawings, a subsidiary casing 44 encloses the spiral grooves 13, 23 of the first and second rotary shafts and the link unit 41. The subsidiary casing 44 cooperates with a restriction plate 46 and the torque module 40 and is mounted in a case 45 together with the restriction plate 46 and the torque module 40. The restriction plate 46 is formed with two perforations 47 for the pivoted sections 12, 22 of the first and second rotary shafts 10, to pass through. After the pivoted sections 12, 22 of the first and second rotary shafts 10, 20 pass through the subsidiary casing 44, the pivoted sections 12, 22 are assembled with the torque module 40.

In this embodiment, a drive member 14 is disposed between the fixed section 11 and the pivoted section 12 of the first rotary shaft 10. The drive member 14 is a tubular body having a shaft hole 15 in which the first rotary shaft 10 is fitted. A drive section 16 is formed on a surface of the drive member 14. The drive section 16 is a rail or a groove including a straight (annular) section 16a and an oblique (spiral) section 16b connected with the straight section 16a.

FIG. 3 shows that one end of the drive member 14 is formed with a shoulder section 17 and an insertion block 18 is formed on the shoulder section 17. The insertion block 18 is inserted in a hole 48 formed on the restriction plate 46. Therefore, when a user operates and rotates the display module 32 and the second rotary shaft 20 to make the link unit 41 drive and rotate the first rotary shaft 10 and the apparatus body module 31, the case 45 and the restriction plate 46 also drive the drive member 14 to rotate.

FIG. 3 also shows that the drive section 16 of the drive member 14 is assembled with a driver 50. In this embodiment, the driver 50 is formed with an arched section 51 and a guide section 52 disposed on the arched section 51 corresponding to the tubular structure of the drive member 14 and the drive section 16 of the drive member 14. The guide section 52 has the form of a key and is inlaid in the drive section 16. When the apparatus body module 31 and the display module 32 are positioned in a closed position, the guide section 52 is positioned in a start point of the straight section 16a of the drive section 16. Therefore, the end point of the straight section 16a means a junction between the straight section 16a and the oblique section 16b.

As shown in the drawings, the driver 50 includes a hand section 53 formed with a bolt hole 54. The hand section 53 is assembled on the fixing board 33 of the apparatus body module 31. To speak more specifically, the fixing board 33 is formed with a rail 34 in the form of a slot. A bolt 55 is passed through the bolt hole 54 of the hand section 53 and the rail 34 to assemble the hand section 53 on the fixing board 33, whereby the driver 50 or the hand section 53 is movable along the rail 34. The position where the bolt hole 54 of the hand section 53 and the bolt 55 are assembled on the rail 34 is defined as a first position. The position where the hand section 53 and the bolt 55 are moved to the other end of the rail 34 is defined as a second position.

It should be noted that with the axial direction of the rail 34 as a reference axis, the direction in which the driver 50 or the hand section 53 is moved along the rail 34 is defined as a transverse displacement. Therefore, the direction normal to the transverse displacement is defined as a longitudinal displacement.

FIG. 3 shows that the driver 50 or the bolt hole 54 is pivotally connected with a turning unit 60, which is an L-shaped plate body. The turning unit 60 has a first end 61, a second end 62 and a middle section 63 connected between the first and second ends 61, 62. The first end 61 of the turning unit is formed with an assembling hole 64. The bolt 55 is also passed through the assembling hole 64 to connect the turning unit 60 with the bolt hole 54 of the driver 50. Accordingly, the turning unit 60 is movable with the driver 50 or the hand section 53 along the rail 34 of the fixing board 33. The second end 62 is formed with an assembling hole 65 pivotally connected with a transmission unit 70. The middle section 63 is formed with an assembling hole 66 pivotally connected with the fixing board 33 of the apparatus body module 31 to serve as a rotational or swinging fulcrum.

In this embodiment, the transmission unit 70 is a board body including a transmission section 71 and a pivoted end 72 pivotally connected with the second end 62 of the turning unit 60 by means of a fixing member 75. The transmission section 71 includes a push end 73 and at least one cantilever 74 positioned on one side of the push end 73. The cantilever 74 is elastically expandable.

To speak more specifically, the push end 73 is positioned at the middle of the transmission unit 70. The cantilever 74 gradually obliquely extends toward the axial direction of the transmission unit 70. A free end of the cantilever 74 is formed with a finger (hook-like) section 76. The cantilever 74 has a length larger than a length of the push end 73, which protrudes from the transmission unit 70.

Figure 3A:
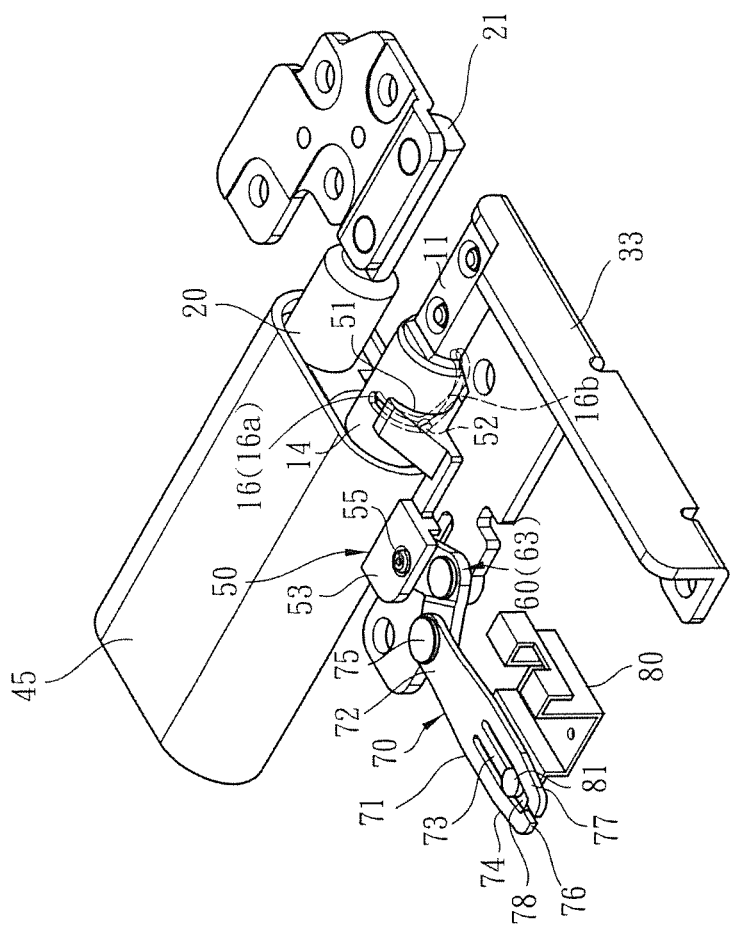
FIG. 3A is a perspective view of an embodiment of the transmission unit of the present invention, showing that the cantilever and the subsidiary cantilever are symmetrical to each other.

FIG. 3 also shows that the transmission unit 70 further includes a subsidiary cantilever 77. As shown in FIG. 3A, the subsidiary cantilever 77 can be symmetrical to the cantilever 74. The cantilever 74, the subsidiary cantilever 77 and the push end 73 together define a space 78.

In a preferred embodiment, the transmission section 71 of the transmission unit 70 is drivingly connected with a connection section 80. The connection section 80 is a board body having a first side and a second side. A pin member 81 is disposed on the first side and inserted in the space 78 of the transmission unit 70 in contact with the push end 73, the cantilever 74 and the subsidiary cantilever 77. A carrier body 90 is affixed or connected to the second side of the connection section 80. The carrier body 90 is disposed on the apparatus body module 31 for pushing a base body or a frame (not shown) to ascend/descend as in the conventional device.

Figure 4:
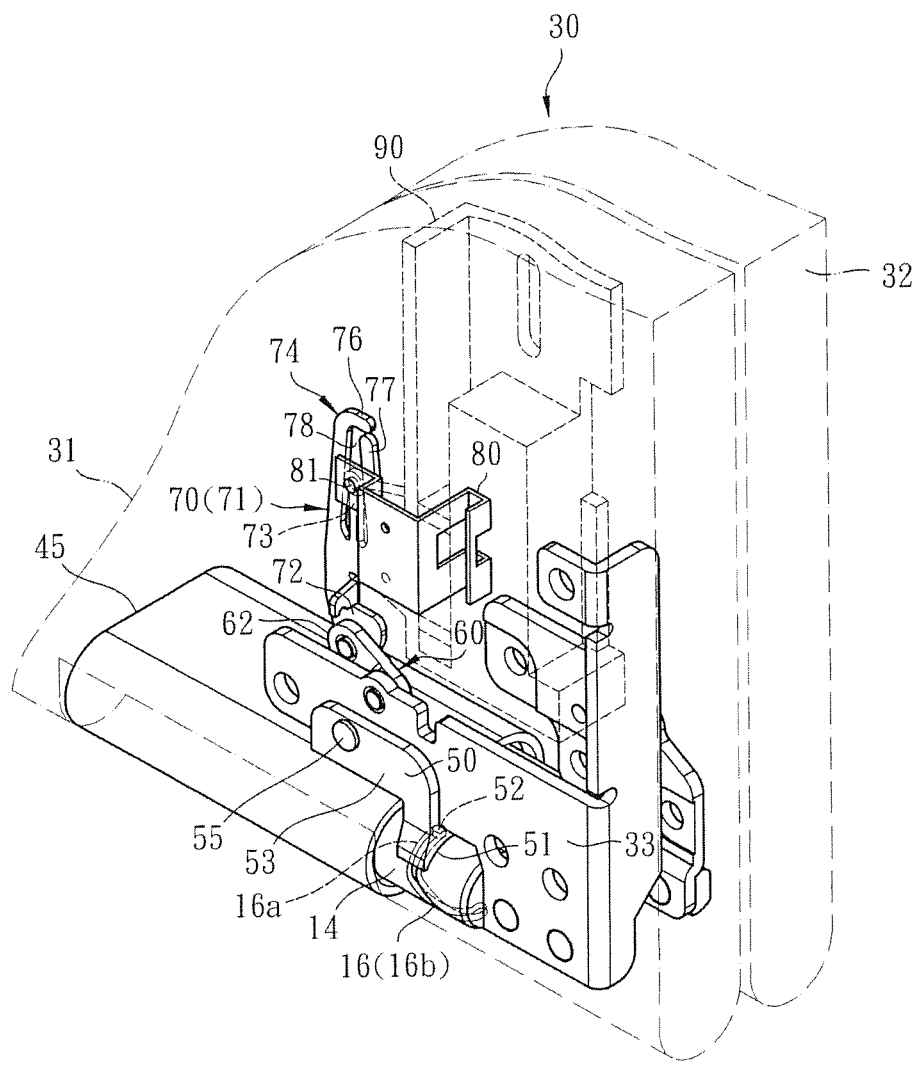
FIG. 4 is a perspective view of the present invention, showing that the display module is closed onto the apparatus body module and also showing the cooperation between the components of the transmission device.
Figure 5:
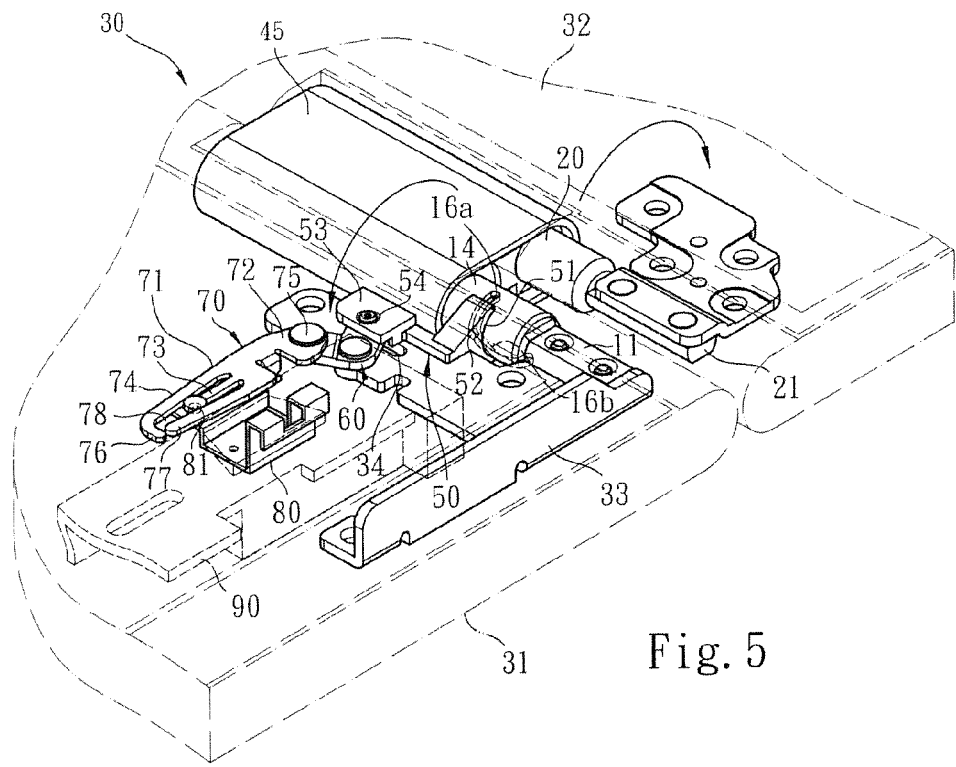
FIG. 5 is a perspective view of the present invention, showing that the first and second rotary shafts are respectively 90° rotated and the apparatus body module and the display module are 180° opened and also showing the cooperation between the drive member, the driver, the turning unit, the transmission unit and the connection section.
Figure 5A:
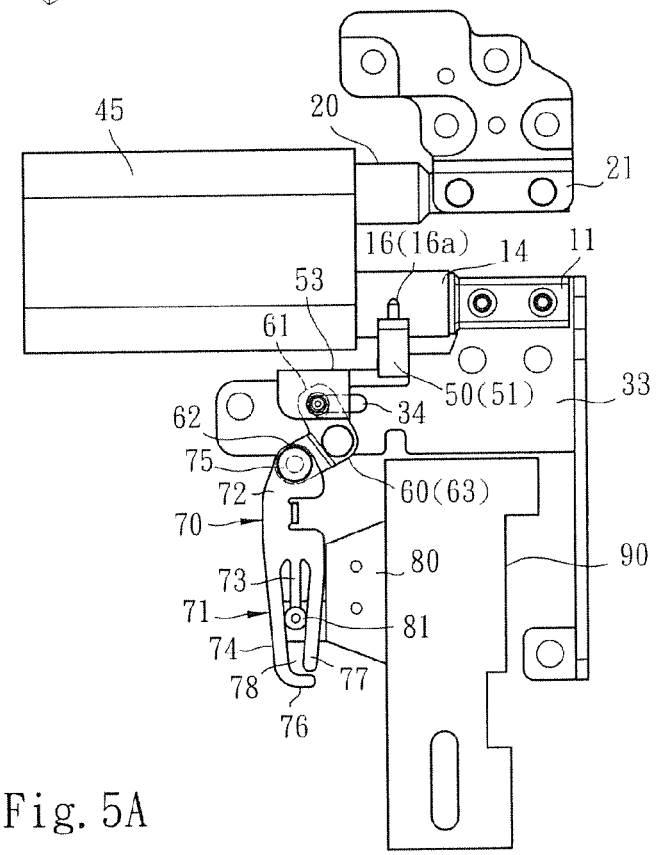
FIG. 5A is a plane view according to FIG. 5.

Please now refer to FIGS. 4, 5 and 5A. FIG. 4 shows that the apparatus body module 31 and the display module 32 are positioned in the closed position and the guide section 52 is positioned at the start point of the straight section 16a of the drive section 16. FIGS. 5 and 5A show that a user operates the display module 32 and the second rotary shaft 20 to 90° rotate. At the same time, the apparatus body module 31 and the first rotary shaft 10 are relatively 90° rotated, whereby the case 45 and the restriction plate 46 also drive the drive member 14 to rotate on the first rotary shaft 10. In this case, the guide section 52 of the driver 50 is relatively moved to the end point of the straight section 16a of the drive section 16.

Figure 6:
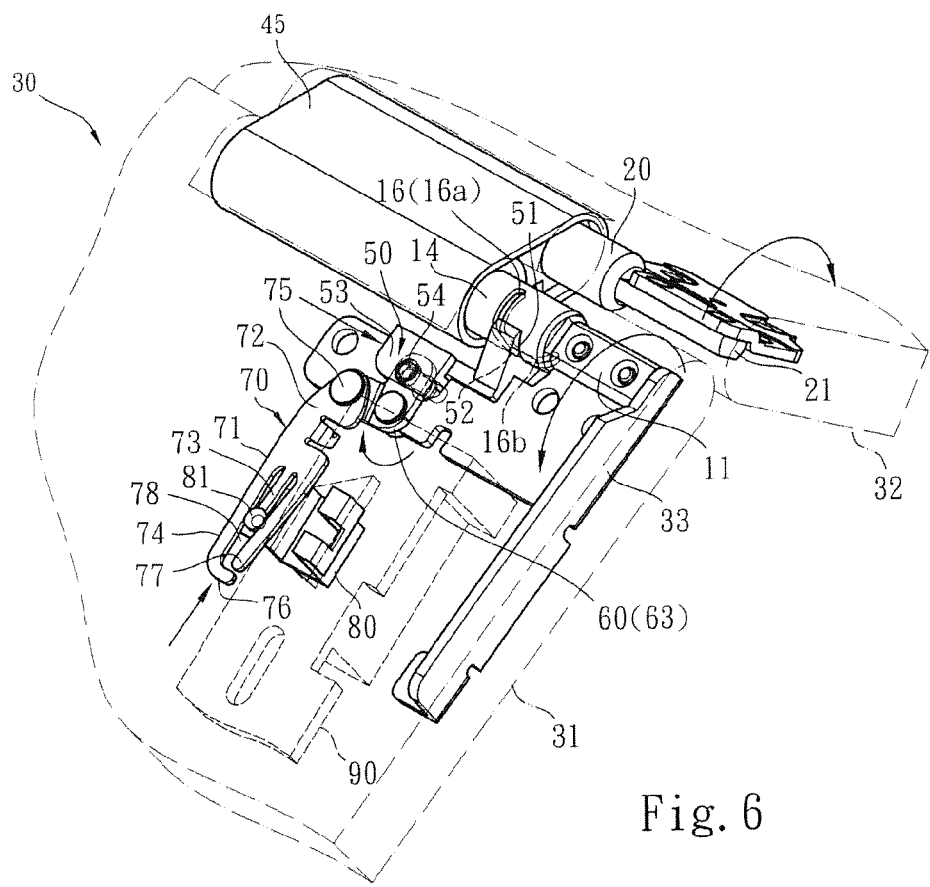
FIG. 6 is another perspective view of the present invention, showing that the first and second rotary shafts are respectively 135° rotated and the apparatus body module and the display module are 270° opened and also showing the cooperation between the drive member, the driver, the turning unit, the transmission unit and the connection section.
Figure 6A:
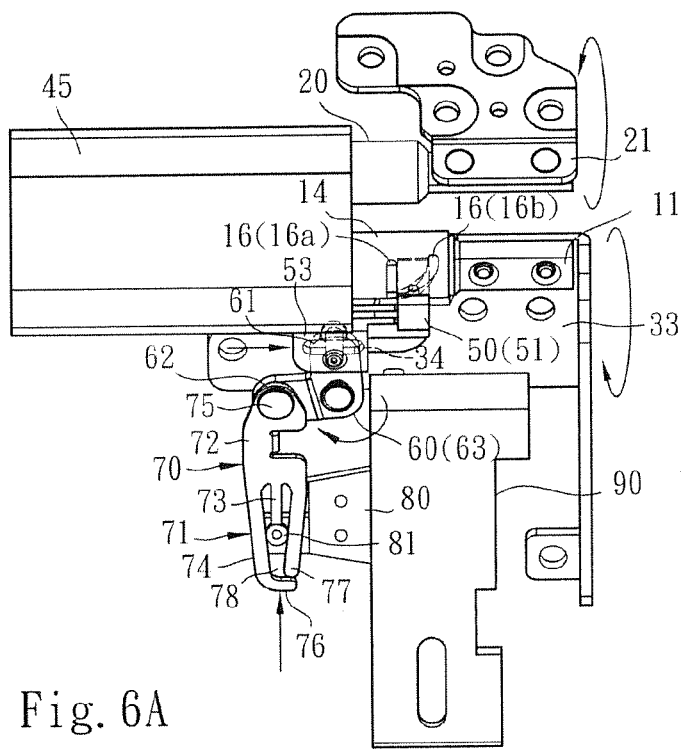
FIG. 6A is a plane view according to FIG. 6.

Please now refer to FIGS. 6 and 6A, which show that the user operates the display module 32 and the second rotary shaft 20 to 135° rotate. At the same time, the apparatus body module 31 and the first rotary shaft 10 are relatively 135° rotated, whereby the case 45 and the restriction plate 46 also drive the drive member 14 to rotate on the first rotary shaft 10. In this case, the guide section 52 of the driver 50 is relatively moved from the end point of the straight section 16a of the drive section 16 into the oblique section 16b, whereby the guide section 52 of the driver 50 is transversely moved along the rail 34 from the first position toward the second position (right side of the drawing) to make the turning unit 60 swing. At this time, the transmission unit 70 is pushed by the turning unit 60 to move to upper side of the drawing. Accordingly, the finger section 76 of the transmission unit 70 pulls the pin member 81 of the connection section 80 to make the connection section 80 and the carrier body 90 (longitudinally) displace. Therefore, the carrier body 90 can lift the base body or the frame as in the conventional device.

Figure 7:
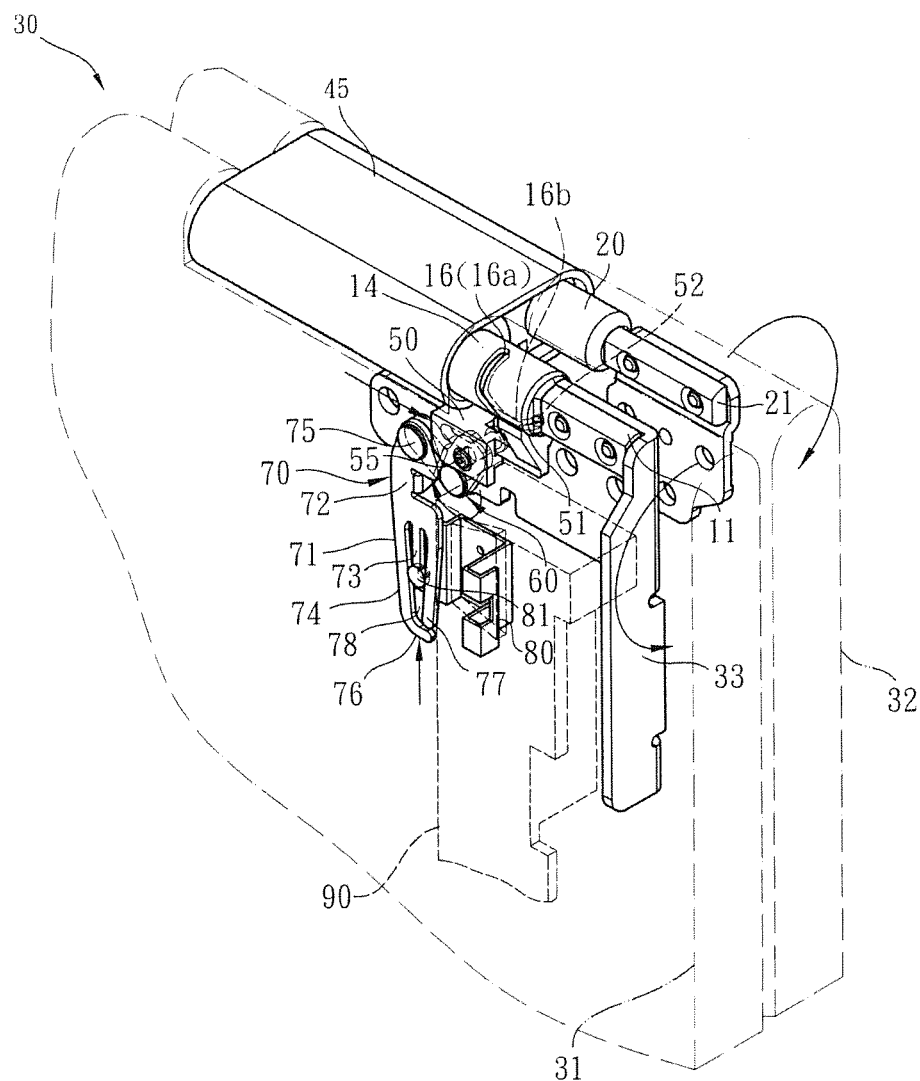
FIG. 7 is still another perspective view of the present invention, showing that the first and second rotary shafts are respectively 180° rotated and the apparatus body module and the display module are 360° opened and also showing the cooperation between the drive member, the driver, the turning unit, the transmission unit and the connection section.

FIG. 7 shows that the user operates the display module 32 and the second rotary shaft 20 to 180° rotate. At the same time, the apparatus body module 31 and the first rotary shaft 10 are relatively 180° rotated. (That is, the apparatus body module 31 and the display module 32 or the first rotary shaft 10 and the second rotary shaft 20 are totally relatively rotated by 360°). Accordingly, the case 45 and the restriction plate 46 also drive the drive member 14 to rotate on the first rotary shaft 10. In this case, the guide section 52 of the driver 50 is relatively moved to reach the end point of the oblique section 16b of the drive section 16. Simultaneously, the guide section 52 of the driver 50 is moved along the rail 3L to reach the second position to make the turning unit 60 further swing. At this time, the finger section 76 of the transmission unit 70 further pulls the connection section 80 and the carrier body 90 to lift the base body or the frame to a highest position where the frame is higher than the keyboard to serve as a support frame for the electronic apparatus as in the conventional device. Under such circumstance, the frame can protect and prevent the keyboard disposed on the apparatus body module from being mis-touched.

It should be noted that when the finger section 76 of the cantilever 74 pulls the pin member 81 to move the connection section 80 and the carrier body 90, in case an operator mispresses the frame and thus the frame cannot be successfully lifted, the cantilever 74 and/or the subsidiary cantilever 77 can be elastically expanded to prevent the finger section 76 from being pressed by the pin member 81 and broken.

It should be noted that when a user operates the display module 32 and the second rotary shaft 20 and the apparatus body module 31 and the first rotary shaft 10 to rotate from the 180° position to the closed position, the case 45 and the restriction plate 46 also drive the drive member 14 to rotate on the first rotary shaft 10. At this time, the guide section 52 of the driver 50 is relatively moved from the end point of the oblique section 16b to the straight section 16a of the drive section 16. Simultaneously, the hand section 53 and the bolt 55 of the driver 50 are moved from the second position to the first position to make the turning unit 60 swing to push the transmission unit 70 to lower side of the drawing. Therefore, the push end 71 of the transmission unit 70 pushes the pin member 81, the connection section 80 and the carrier body 90 back to the home position and lower the frame.

In condition of lightweight and thin design, in comparison with the conventional device, the transmission device applied to rotary shafts of the present invention has the following advantages:

1. The rotary shafts and the relevant components are redesigned and different from the conventional device in use and operation form. For example, the rotary shaft (or the first rotary shaft 10) is provided with a drive member 14 in cooperation with the driver 50, the turning unit 60 and the transmission unit 70. The cantilever 74 and the subsidiary cantilever 76 of the transmission unit 70 are elastically expandable. The transmission section 71 of the transmission unit 70 serves to drive the connection section 80 and the carrier body 90 to move. In contrast, the case of the conventional device must be formed with a large notch for assembling with the transmission device. This will affect the appearance design and visual feeling of the electronic apparatus as a whole. Also, it is hard to reduce the volume of the case. Moreover, the dust or the like is likely to accumulate on the components arranged in the case to affect the transmission function. The transmission device of the present invention overcomes this problem.

2. The driver 50, turning unit 60, transmission unit 70 and connection section 80 of the transmission device 70, such cooperate with each other that a worker can easily assemble these components. In contrast, in the conventional device, the connection section B3 must be equipped with a claw section B5 for holding the transmission support B2. In addition, an L-shaped restriction board A5 is disposed on the chassis A4 of the apparatus body module A1. The restriction board A5 is assembled with the raised section B6 of the connection section B3. The cooperative structure between the transmission support B2, the connection section B3 and the chassis A4 is relatively complicated. This increases the difficulty in assembling the components. The transmission device of the present invention overcomes this problem.

3. In the transmission device of the present invention, only one single rotary shaft of the apparatus body module 31 and the display module 32 is assembled with the drive member 14, the driver 50, the turning unit 60 and the transmission unit 70 to achieve the transmission effect. In addition, the (spiral) angle of the straight section 16a and the oblique section 16b of the drive section 16 of the drive member can be designed and adjusted according to actual requirement to change the operation form and angle of the apparatus body module 31 and the display module 32 and the transmission device.

In conclusion, the transmission device applied to rotary shafts of the present invention is different from and advantageous over the conventional device.

The above embodiments are only used to illustrate the present invention, not intended to limit the scope thereof. Many modifications of the above embodiments can be made without departing from the spirit of the present invention.

What is claimed is:

1. A transmission device applied to rotary shafts, comprising:
   a first and second rotary shaft, each rotary shaft having a fixed section and a pivoted section, the pivoted section of each rotary shaft being assembled with a torque module;
   a drive member disposed on the first rotary shaft, the drive member being formed with a drive section;
   a driver having a guide section assembled with the drive section and a hand section, the hand section being movable along a rail between a first position and a second position;
   a turning unit including a first end pivotally connected with the hand section of the driver, a second end and a middle section connected between the first and second ends, wherein the middle section is pivotally fixed relative to the rail to serve as a movement fulcrum; and
   a transmission unit having a pivoted end pivotally connected with the second end of the turning unit and a transmission section, when the first rotary shaft rotates, the driver guide section engages the drive member drive section to move the driver along the rail, the driver moves the turning unit, the turning unit moves the transmission unit, the transmission section drives a connection section to move.

2. The transmission device applied to rotary shafts as claimed in claim 1, wherein the first rotary shaft is disposed on an electronic apparatus including an apparatus body module and a display module,
   the rail being disposed on a fixing board of the apparatus body module, the hand section of the driver being formed with a bolt hole, a bolt being passed through the bolt hole to assemble the driver on the fixing board, whereby the hand section is movable along the rail, the rail being a slot.

3. The transmission device applied to rotary shafts as claimed in claim 2, wherein the fixed section of the first rotary shaft being connected with and disposed on the fixing board of the apparatus body module, the fixed section of the second rotary shaft being connected with and disposed on the display module, the drive member being disposed on the first rotary shaft, the first and second rotary shaft being enclosed in a subsidiary casing, a restriction plate, the subsidiary casing and the torque module being together mounted in a case, the restriction plate being formed with two perforations for the pivoted sections of the first and second rotary shafts to pass through respectively.

4. The transmission device applied to rotary shafts as claimed in claim 1, wherein the drive member is a tubular body having a shaft hole, the first rotary shaft being fitted in the shaft hole, the drive section being formed on a surface of the drive member, the drive section being a groove including a straight section and an oblique section connected with the straight section.

5. The transmission device applied to rotary shafts as claimed in claim 2, wherein the drive member is a tubular body having a shaft hole, the first rotary shaft being fitted in the shaft hole, the drive section being formed on a surface of the drive member, the drive section being a groove including a straight section and an oblique section connected with the straight section.

6. The transmission device applied to rotary shafts as claimed in claim 3, wherein the drive member is a tubular body having a shaft hole, the first rotary shaft being fitted in the shaft hole, the drive section being formed on a surface of the drive member, the drive section being a groove including a straight section and an oblique section connected with the straight section, one end of the drive member being formed with a shoulder section and an insertion block formed on the shoulder section, the insertion block being inserted in a hole formed on the restriction plate.

7. The transmission device applied to rotary shafts as claimed in claim 4, wherein the driver is formed with an arched section corresponding to the tubular body of the drive member, the guide section being formed on the arched section in the form of a key, the guide section being inlaid in the drive section.

8. The transmission device applied to rotary shafts as claimed in claim 5, wherein the driver is formed with an arched section corresponding to the tubular body of the drive member, the guide section being formed on the arched section in the form of a key, the guide section being inlaid in the drive section.

9. The transmission device applied to rotary shafts as claimed in claim 6, wherein the driver is formed with an arched section corresponding to the tubular body of the drive member, the guide section being formed on the arched section in the form of a key, the guide section being inlaid in the drive section.

10. The transmission device applied to rotary shafts as claimed in claim 1, wherein the turning unit is an L-shaped plate body, each of the first and second ends and the middle section being formed with an assembling hole, a bolt being passed through the assembling hole of the first end to connect the first end with the hand section of the driver, the assembling hole of the second end being pivotally connected with the pivoted end of the transmission unit, the assembling hole of the middle section being pivotally connected on a fixing board to serve as the movement fulcrum.

11. The transmission device applied to rotary shafts as claimed in claim 2, wherein the turning unit is an L-shaped plate body, each of the first and second ends and the middle section being formed with an assembling hole, the bolt being passed through the assembling hole of the first end to connect the first end with the hand section of the driver, the assembling hole of the second end being pivotally connected with the pivoted end of the transmission unit, the assembling hole of the middle section being pivotally connected on the fixing board to serve as the movement fulcrum.

12. The transmission device applied to rotary shafts as claimed in claim 4, wherein the turning unit is an L-shaped plate body, each of the first and second ends and the middle section being formed with an assembling hole, a bolt being passed through the assembling hole of the first end to connect the first end with the hand section of the driver, the assembling hole of the second end being pivotally connected with the pivoted end of the transmission unit, the assembling hole of the middle section being pivotally connected on a fixing board to serve as the movement fulcrum.

13. The transmission device applied to rotary shafts as claimed in claim 6, wherein the turning unit is an L-shaped plate body, each of the first and second ends and the middle section being formed with an assembling hole, the bolt being passed through the assembling hole of the first end to connect the first end with the hand section of the driver, the assembling hole of the second end being pivotally connected with the pivoted end of the transmission unit, the assembling hole of the middle section being pivotally connected on the fixing board to serve as the movement fulcrum.

14. The transmission device applied to rotary shafts as claimed in claim 7, wherein the turning unit is an L-shaped plate body, each of the first and second ends and the middle section being formed with an assembling hole, a bolt being passed through the assembling hole of the first end to connect the first end with the hand section of the driver, the assembling hole of the second end being pivotally connected with the pivoted end of the transmission unit, the assembling hole of the middle section being pivotally connected on a fixing board to serve as the movement fulcrum.

15. The transmission device applied to rotary shafts as claimed in claim 1, wherein the transmission unit is a board body, the pivoted end of the transmission unit being pivotally connected with the second end of the turning unit by means of a fixing member, the transmission section including a push end and at least one cantilever positioned on one side of the push end, a free end of the cantilever being formed with a finger section, the transmission unit further including a subsidiary cantilever, at least one of the cantilever and the subsidiary cantilever being elastically expandable, the cantilever and the subsidiary cantilever being symmetrical to or asymmetrical to each other, the cantilever, the subsidiary cantilever and the push end together defining a space, the push end being positioned at the middle of the transmission unit, the cantilever gradually obliquely extending toward an axial direction of the transmission unit, the cantilever having a length larger than a length of the push end, which protrudes from the transmission unit.

16. The transmission device applied to rotary shafts as claimed in claim 2, wherein the transmission unit is a board body, the pivoted end of the transmission unit being pivotally connected with the second end of the turning unit by means of a fixing member, the transmission section including a push end and at least one cantilever positioned on one side of the push end, a free end of the cantilever being formed with a finger section, the transmission unit further including a subsidiary cantilever, at least one of the cantilever and the subsidiary cantilever being elastically expandable, the cantilever and the subsidiary cantilever being symmetrical to or asymmetrical to each other, the cantilever, the subsidiary cantilever and the push end together defining a space, the push end being positioned at the middle of the transmission unit, the cantilever gradually obliquely extending toward an axial direction of the transmission unit, the cantilever having a length larger than a length of the push end, which protrudes from the transmission unit.

17. The transmission device applied to rotary shafts as claimed in claim 4, wherein the transmission unit is a board body, the pivoted end of the transmission unit being pivotally connected with the second end of the turning unit by means of a fixing member, the transmission section including a push end and at least one cantilever positioned on one side of the push end, a free end of the cantilever being formed with a finger section, the transmission unit further including a subsidiary cantilever, at least one of the cantilever and the subsidiary cantilever being elastically expandable, the cantilever and the subsidiary cantilever being symmetrical to or asymmetrical to each other, the cantilever, the subsidiary cantilever and the push end together defining a space, the push end being positioned at the middle of the transmission unit, the cantilever gradually obliquely extending toward an axial direction of the transmission unit, the cantilever having a length larger than a length of the push end, which protrudes from the transmission unit.

18. The transmission device applied to rotary shafts as claimed in claim 6, wherein the transmission unit is a board body, the pivoted end of the transmission unit being pivotally connected with the second end of the turning unit by means of a fixing member, the transmission section including a push end and at least one cantilever positioned on one side of the push end, a free end of the cantilever being formed with a finger section, the transmission unit further including a subsidiary cantilever, at least one of the cantilever and the subsidiary cantilever being elastically expandable, the cantilever and the subsidiary cantilever being symmetrical to or asymmetrical to each other, the cantilever, the subsidiary cantilever and the push end together defining a space, the push end being positioned at the middle of the transmission unit, the cantilever gradually obliquely extending toward an axial direction of the transmission unit, the cantilever having a length larger than a length of the push end, which protrudes from the transmission unit.

19. The transmission device applied to rotary shafts as claimed in claim 7, wherein the transmission unit is a board body, the pivoted end of the transmission unit being pivotally connected with the second end of the turning unit by means of a fixing member, the transmission section including a push end and at least one cantilever positioned on one side of the push end, a free end of the cantilever being formed with a finger section, the transmission unit further including a subsidiary cantilever, at least one of the cantilever and the subsidiary cantilever being elastically expandable, the cantilever and the subsidiary cantilever being symmetrical to or asymmetrical to each other, the cantilever, the subsidiary cantilever and the push end together defining a space, the push end being positioned at the middle of the transmission unit, the cantilever gradually obliquely extending toward an axial direction of the transmission unit, the cantilever having a length larger than a length of the push end, which protrudes from the transmission unit.

20. The transmission device applied to rotary shafts as claimed in claim 10, wherein the transmission unit is a board body, the pivoted end of the transmission unit being pivotally connected with the second end of the turning unit by means of a fixing member, the transmission section including a push end and at least one cantilever positioned on one side of the push end, a free end of the cantilever being formed with a finger section, the transmission unit further including a subsidiary cantilever, at least one of the cantilever and the subsidiary cantilever being elastically expandable, the cantilever and the subsidiary cantilever being symmetrical to or asymmetrical to each other, the cantilever, the subsidiary cantilever and the push end together defining a space, the push end being positioned at the middle of the transmission unit, the cantilever gradually obliquely extending toward an axial direction of the transmission unit, the cantilever having a length larger than a length of the push end, which protrudes from the transmission unit.

21. The transmission device applied to rotary shafts as claimed in claim 11, wherein the transmission unit is a board body, the pivoted end of the transmission unit being pivotally connected with the second end of the turning unit by means of a fixing member, the transmission section including a push end and at least one cantilever positioned on one side of the push end, a free end of the cantilever being formed with a finger section, the transmission unit further including a subsidiary cantilever, at least one of the cantilever and the subsidiary cantilever being elastically expandable, the cantilever and the subsidiary cantilever being symmetrical to or asymmetrical to each other, the cantilever, the subsidiary cantilever and the push end together defining a space, the push end being positioned at the middle of the transmission unit, the cantilever gradually obliquely extending toward an axial direction of the transmission unit, the cantilever having a length larger than a length of the push end, which protrudes from the transmission unit.

22. The transmission device applied to rotary shafts as claimed in claim 12, wherein the transmission unit is a board body, the pivoted end of the transmission unit being pivotally connected with the second end of the turning unit by means of a fixing member, the transmission section including a push end and at least one cantilever positioned on one side of the push end, a free end of the cantilever being formed with a finger section, the transmission unit further including a subsidiary cantilever, at least one of the cantilever and the subsidiary cantilever being elastically expandable, the cantilever and the subsidiary cantilever being symmetrical to or asymmetrical to each other, the cantilever, the subsidiary cantilever and the push end together defining a space, the push end being positioned at the middle of the transmission unit, the cantilever gradually obliquely extending toward an axial direction of the transmission unit, the cantilever having a length larger than a length of the push end, which protrudes from the transmission unit.

23. The transmission device applied to rotary shafts as claimed in claim 13, wherein the transmission unit is a board body, the pivoted end of the transmission unit being pivotally connected with the second end of the turning unit by means of a fixing member, the transmission section including a push end and at least one cantilever positioned on one side of the push end, a free end of the cantilever being formed with a finger section, the transmission unit further including a subsidiary cantilever, at least one of the cantilever and the subsidiary cantilever being elastically expandable, the cantilever and the subsidiary cantilever being symmetrical to or asymmetrical to each other, the cantilever, the subsidiary cantilever and the push end together defining a space, the push end being positioned at the middle of the transmission unit, the cantilever gradually obliquely extending toward an axial direction of the transmission unit, the cantilever having a length larger than a length of the push end, which protrudes from the transmission unit.

24. The transmission device applied to rotary shafts as claimed in claim 14, wherein the transmission unit is a board body, the pivoted end of the transmission unit being pivotally connected with the second end of the turning unit by means of a fixing member, the transmission section including a push end and at least one cantilever positioned on one side of the push end, a free end of the cantilever being formed with a finger section, the transmission unit further including a subsidiary cantilever, at least one of the cantilever and the subsidiary cantilever being elastically expandable, the cantilever and the subsidiary cantilever being symmetrical to or asymmetrical to each other, the cantilever, the subsidiary cantilever and the push end together defining a space, the push end being positioned at the middle of the transmission unit, the cantilever gradually obliquely extending toward an axial direction of the transmission unit, the cantilever having a length larger than a length of the push end, which protrudes from the transmission unit.

25. The transmission device applied to rotary shafts as claimed in claim 15, wherein the connection section is a board body having a first side and a second side, a pin member being disposed on the first side and inserted in the space of the transmission unit in contact with the push end, the cantilever and the subsidiary cantilever, a carrier body being connected with the second side of the connection section.

26. The transmission device applied to rotary shafts as claimed in claim 16, wherein the connection section is a board body having a first side and a second side, a pin member being disposed on the first side and inserted in the space of the transmission unit in contact with the push end, the cantilever and the subsidiary cantilever, a carrier body being connected with the second side of the connection section.

27. The transmission device applied to rotary shafts as claimed in claim 17, wherein the connection section is a board body having a first side and a second side, a pin member being disposed on the first side and inserted in the space of the transmission unit in contact with the push end, the cantilever and the subsidiary cantilever, a carrier body being connected with the second side of the connection section.

28. The transmission device applied to rotary shafts as claimed in claim 18, wherein the connection section is a board body having a first side and a second side, a pin member being disposed on the first side and inserted in the space of the transmission unit in contact with the push end, the cantilever and the subsidiary cantilever, a carrier body being connected with the second side of the connection section.

29. The transmission device applied to rotary shafts as claimed in claim 19, wherein the connection section is a board body having a first side and a second side, a pin member being disposed on the first side and inserted in the space of the transmission unit in contact with the push end, the cantilever and the subsidiary cantilever, a carrier body being connected with the second side of the connection section.

30. The transmission device applied to rotary shafts as claimed in claim 20, wherein the connection section is a board body having a first side and a second side, a pin member being disposed on the first side and inserted in the space of the transmission unit in contact with the push end, the cantilever and the subsidiary cantilever, a carrier body being connected with the second side of the connection section.

31. The transmission device applied to rotary shafts as claimed in claim 21, wherein the connection section is a board body having a first side and a second side, a pin member being disposed on the first side and inserted in the space of the transmission unit in contact with the push end, the cantilever and the subsidiary cantilever, a carrier body being connected with the second side of the connection section.

32. The transmission device applied to rotary shafts as claimed in claim 22, wherein the connection section is a board body having a first side and a second side, a pin member being disposed on the first side and inserted in the space of the transmission unit in contact with the push end, the cantilever and the subsidiary cantilever, a carrier body being connected with the second side of the connection section.

33. The transmission device applied to rotary shafts as claimed in claim 23, wherein the connection section is a board body having a first side and a second side, a pin member being disposed on the first side and inserted in the space of the transmission unit in contact with the push end, the cantilever and the subsidiary cantilever, a carrier body being connected with the second side of the connection section.

34. The transmission device applied to rotary shafts as claimed in claim 24, wherein the connection section is a board body having a first side and a second side, a pin member being disposed on the first side and inserted in the space of the transmission unit in contact with the push end, the cantilever and the subsidiary cantilever, a carrier body being connected with the second side of the connection section.

35. The transmission device applied to rotary shafts as claimed in claim 3, wherein a link unit is disposed between the first and second rotary shafts for synchronously rotating the first and second rotary shafts, the first and second rotary shafts being formed with spiral grooves in adjacency to the pivoted sections, corresponding to the spiral grooves, two ends of the link unit being provided with boss sections, which are respectively inlaid in the spiral grooves.

* * * * *